US012750564B2

(12) United States Patent
Imamura

(10) Patent No.: US 12,750,564 B2
(45) Date of Patent: Sep. 29, 2026

(54) INFORMATION PROCESSING SYSTEM AND INFORMATION PROCESSING METHOD

(71) Applicant: SONY INTERACTIVE ENTERTAINMENT INC., Tokyo (JP)

(72) Inventor: Takashi Imamura, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 18/715,056

(22) PCT Filed: Dec. 10, 2021

(86) PCT No.: PCT/JP2021/045525

§ 371 (c)(1),
(2) Date: May 30, 2024

(87) PCT Pub. No.: WO2023/105750

PCT Pub. Date: Jun. 15, 2023

(65) Prior Publication Data

US 2025/0030924 A1 Jan. 23, 2025

(51) Int. Cl.

*H04N 21/81* (2011.01)
*G06T 13/40* (2011.01)
*G06T 17/00* (2006.01)

(52) U.S. Cl.

CPC ........... *H04N 21/816* (2013.01); *G06T 13/40* (2013.01); *G06T 17/00* (2013.01)

(58) Field of Classification Search

CPC ........ H04N 21/816; G06T 13/40; G06T 17/00
See application file for complete search history.

(56) References Cited

U.S. PATENT DOCUMENTS

2009/0013263 A1* 1/2009 Fortnow ................ G06Q 10/10 715/753

FOREIGN PATENT DOCUMENTS

JP 2019102091 A 6/2019
JP 2019139673 A 8/2019
JP 2021047722 A 3/2021
JP 2021153901 A 10/2021

OTHER PUBLICATIONS

International Search Report for corresponding international application No. PCT/JP2021/045525, dated Feb. 15, 2022, pp. 1-5.

* cited by examiner

*Primary Examiner* — Yassin Alata
(74) *Attorney, Agent, or Firm* — Kilpatrick Townsend & Stockton LLP

(57) ABSTRACT

An HMD (head-mounted display) creates and displays a video of a first room (e.g., a pre-playing lobby) which is a virtual space where a plurality of users who are to view predetermined content gather before the content is played (S11). The HMD creates and displays a video of a second room (e.g., a live concert place) which is a virtual space where the content is played (S14). The HMD creates and displays a video of a third room (e.g., a post-playing lobby) which is a virtual space where the plurality of users gather after the content is played (S16).

20 Claims, 13 Drawing Sheets

FIG. 12
220
230
202
228
PLEASE USE ITEM/CLAP HANDS TO CHEER FOR ME
AMY
ISABEL
DOUGLAS
PLEASE USE ITEM/CLAP HANDS TO CHEER FOR ME

INFORMATION PROCESSING SYSTEM AND INFORMATION PROCESSING METHOD

TECHNICAL FIELD

The present invention relates to a data processing technology and, more particularly, relates to an information processing system and an information processing method.

BACKGROUND ART

Image display systems for allowing a user wearing a head-mounted display to view a subject space from a free view point have become widespread. For example, there has been known electronic content in which a virtual third-dimensional space is defined as a target to be displayed and a virtual reality (VR) is realized by displaying, on a head-mounted display, an image corresponding to the visual line of a user. Using a head-mounted display can enhance a feeling of immersion into a video, or can improve the operability in an application of a game or the like.

Currently, services for distributing video content of a concert (e.g., a live concert and a film concert) and the like to user terminals to allow users to view the video content are provided in some cases.

SUMMARY

Technical Problem

The inventor of the present invention considered that, in order to increase a content-viewing user's degree of satisfaction, it is important not only to ensure the quality of the content, but also to improve the entertainability of the content before, while, and after the content is played.

The present invention has been made in view of the above problem, and an object thereof is to provide a technology of improving the entertainability of content before, while, and after the content is played.

Solution to Problem

In order to solve the above-mentioned problem, an information processing system according to an aspect of the present invention includes a first creation section that creates a video of a first room which is a virtual space where a plurality of users who are to view predetermined content gather before the content is played, a second creation section that creates a video of a second room which is a virtual space where the content is played, a third video creation section that creates a video of a third room which is a virtual space where the plurality of users gather after the content is played, and an output section that displays the video of the first room, the video of the second room, and the video of the third room sequentially on a display section.

Another aspect of the present invention pertains to an information processing method. In this method, a computer executes a step of creating a video of a first room which is a virtual space where a plurality of users who are to view predetermined content gather before the content is played, a step of creating a video of a second room which is a virtual space where the content is played, a step of creating a video of a third room which is a virtual space where the plurality of users gather after the content is played, and a step of displaying the video of the first room, the video of the second room, and the video of the third room sequentially on a display section.

It is to be noted that any combinations of the constituent elements described above and the expressions of the present invention that are converted between a device, a computer program, or a recording medium having a computer program recorded in a readable manner, and a data structure are also effective as aspects of the present invention.

Advantageous Effect of Invention

According to the present invention, the entertainability of content can be improved before, while, and after the content is played.

DESCRIPTION OF EMBODIMENT

The subject of a system, a device, or a method according to the present disclosure has a computer. The computer executes a program to implement functions of the subject of the device or the method according to the present disclosure. The computer includes, as a main part of hardware, a processor that is operated according to the program. Any type of the processor can be used as long as the processor can implement the functions by executing the program. The processor may include one or a plurality of electronic circuits including semiconductor integrated circuits (IC) or large-scale integration (LSI) circuits. The plurality of electronic circuits may be integrated on one chip, or may be mounted on a plurality of chips. The plurality of chips may be integrated in one device, or may be included in a plurality of devices. The program may be recorded in a non-temporal recording medium such as a computer-readable read only memory (ROM), an optical disk, or a hard disk drive. The program may be stored in advance in the recording medium, or may be supplied to the recording medium over a wide area communication network such as the Internet. It is to be noted that the terms "first," "second," etc., in the present description and the claims are not intended to represent any order or importance level, unless otherwise mentioned. Such terms are intended to make sections distinguishable from each other.

An embodiment proposes a content viewing system that offers an original user experience by offering, to the user, a flow line before, while, and after electronic content is played such that the flow line is close to a flow line of event viewing in a real space. In the content viewing system according to the embodiment, video content is distributed to head-mounted displays (hereinafter, also referred to as "HMDs") mounted on the heads of a plurality of users, to allow the plurality of users to view the video content at the same time.

Figure 1:
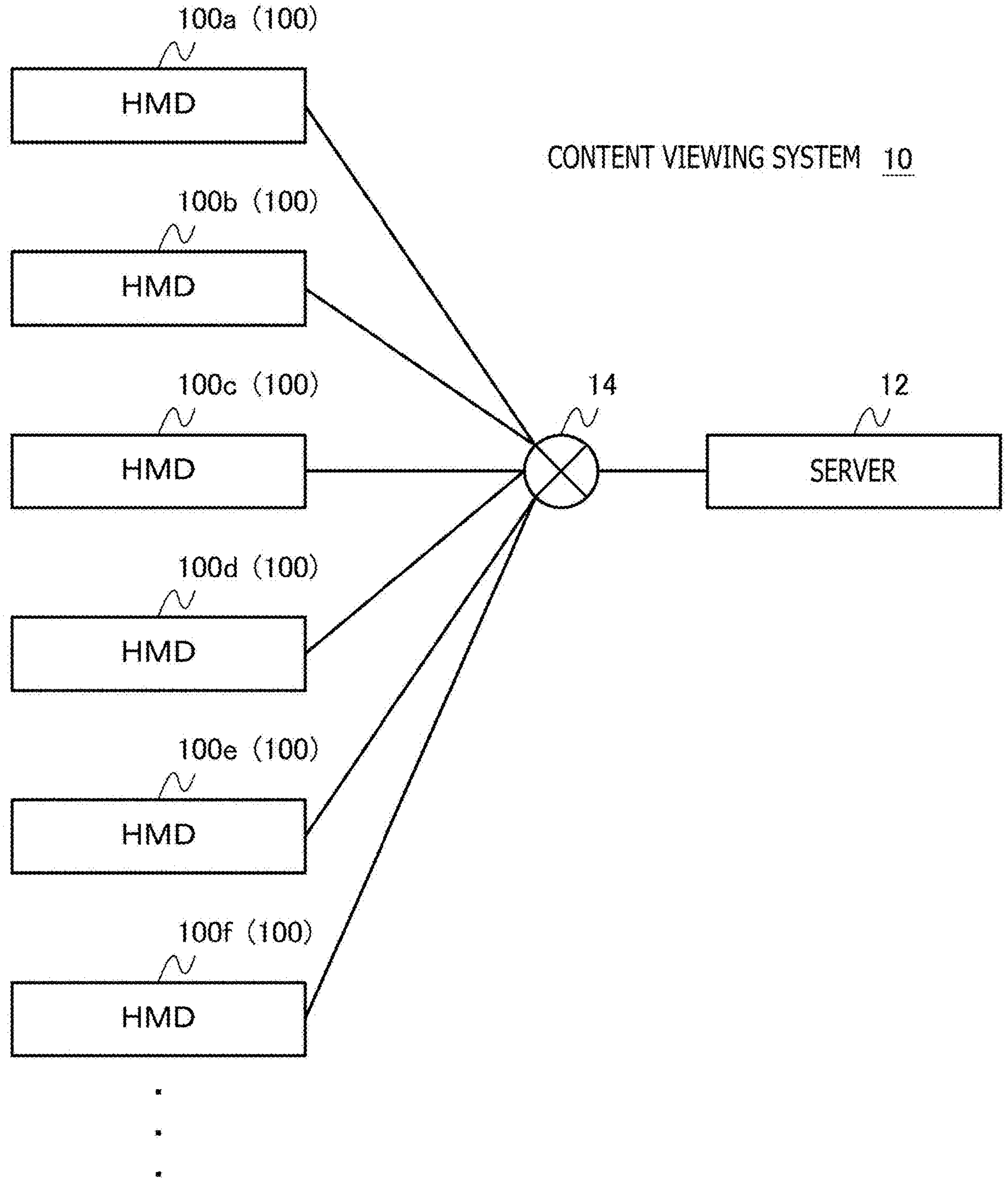
FIG. 1 is a diagram depicting a configuration of a content viewing system according to an embodiment.

FIG. 1 depicts a configuration of a content viewing system 10 according to the embodiment. The content viewing system 10 includes a plurality of HMDs 100 (FIG. 1 depicts an HMD 100*a* to an HMD 100*f*) which are used by a plurality of users, and a server 12. The HMDs 100 and the server 12 are connected via a communication network 14 that can include a local area network (LAN), a wide area network (WAN), the Internet, etc.

The server 12 is an information processing device that distributes video content to the HMDs 100 and also controls a variety of effects regarding video content viewing. Video content to be distributed from the server 12 can include videos of a variety of categories and genres. In the embodiment, it is assumed that the server 12 distributes video content (hereinafter, referred to as a "live concert video") obtained by shooting a concert live. A detailed explanation of the server 12 will be given later.

The HMD 100 is a head-mounted display device that is mounted on a user's head and displays VR images. A live concert video provided from the server 12 is displayed on a VR space displayed on the HMD 100, and further, avatars (also called as characters) of a plurality of users are displayed before, while, and after the live concert video is played.

Figure 2:
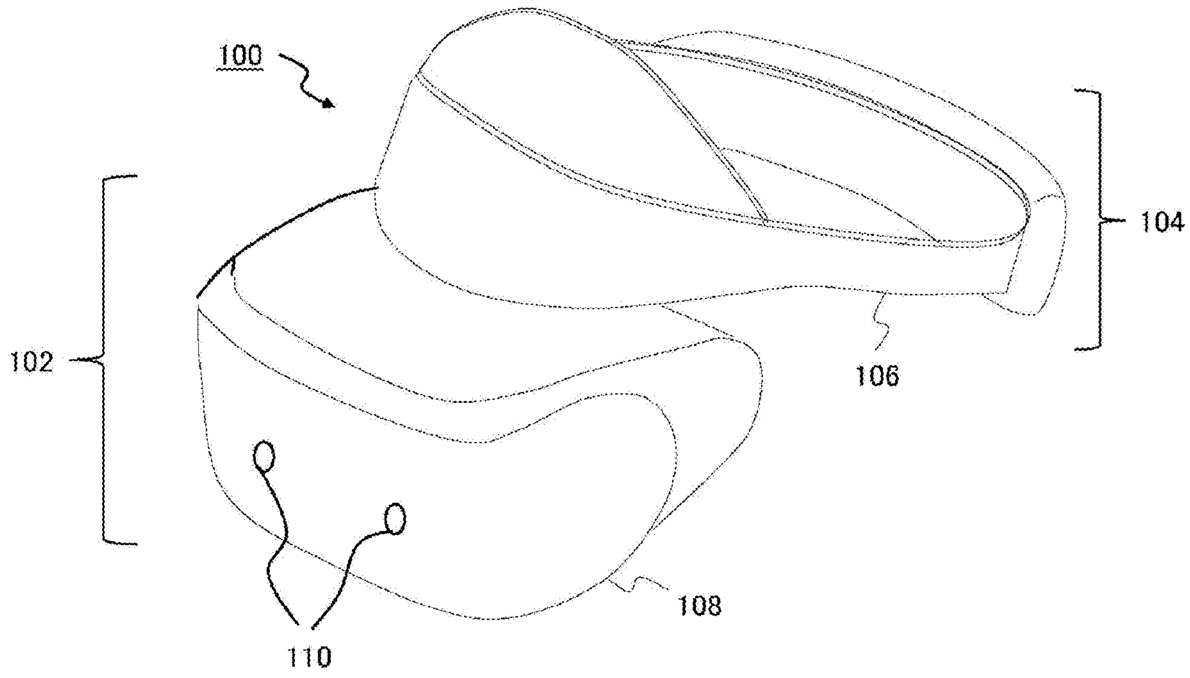
FIG. 2 is a diagram depicting an example of the appearance of an HMD in FIG. 1.

FIG. 2 depicts an example of the appearance of the HMD 100 in FIG. 1. The HMD 100 includes an output structure part 102 and a fitting structure part 104. The fitting structure part 104 includes a fitting band 106 that surrounds the head of a user when worn by the user and that fixes the device.

The output structure part 102 includes a casing 108 that has a shape to cover left and right eyes of the user when the user is wearing the HMD 100. A display panel that directly faces the eyes when the user is wearing the HMD 100 is included in the casing 108. It is assumed that the display panel of the HMD 100 according to the embodiment does not have transmissibility. Thus, the HMD 100 according to the embodiment is a head-mounted display of a type that does not transmit light therethrough.

An ocular lens that is positioned between the display panel and the user's eyes when the user is wearing the HMD 100 and that enlarges the viewing angle of the user may further be included in the casing 108. The HMD 100 may further include a loudspeaker or an earphone at a position that corresponds to a user's ear when the user is wearing the HMD 100. In addition, the HMD 100 includes a motion sensor. The motion sensor detects translation movement or rotational movement of the head of the user wearing the HMD 100, and thus detects the position and the posture at each clock time.

The HMD 100 further includes a stereo camera 110 on the front surface of the casing 108. The stereo camera 110 captures a video of a surrounding real space within a viewing field corresponding to the visual line of the user. When a captured image is displayed in real time, an unprocessed real space in the facing direction of the user can be seen. That is, video see-through can be realized. Further, augmented reality (AR) can be realized by rendering a virtual object on a real object image in the photographed image.

Figure 3:
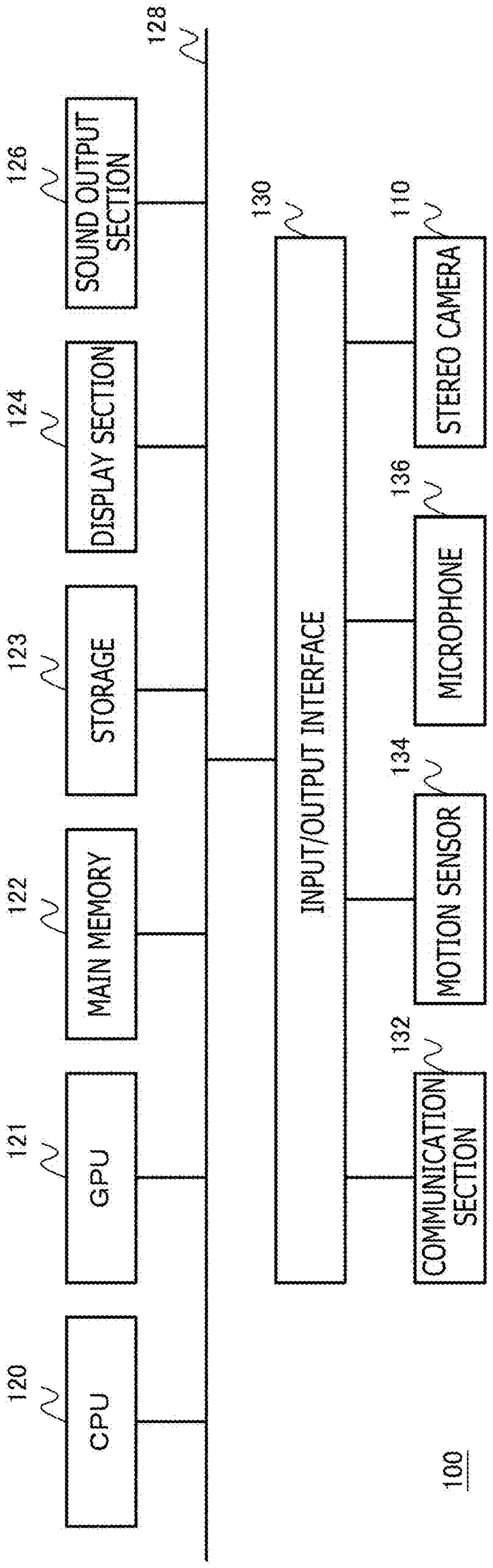
FIG. 3 is a diagram depicting an internal circuit configuration of the HMD in FIG. 1.

FIG. 3 is a diagram depicting an internal circuit configuration of the HMD 100 in FIG. 1. The HMD 100 includes a central processing unit (CPU) 120, a graphics processing unit (GPU) 121, a main memory 122, a storage 123, a display section 124, and a sound output section 126. These sections are mutually connected via a bus 128. Further, an input/output interface 130 is connected to the bus 128. A communication section 132 equipped with a wireless communication interface, a motion sensor 134, a microphone 136, and the stereo camera 110 are connected to the input/output interface 130.

The CPU 120 processes information acquired from the sections of the HMD 100 via the bus 128, and supplies video data and sound data acquired from the server 12 to the display section 124 and the sound output section 126. The GPU 121 executes image processing based on a command transmitted from the CPU 120. For example, the GPU 121 creates data regarding a VR image indicating a VR space to be displayed on the display section 124.

The main memory 122 stores programs and data that are required for processing at the CPU 120 and the GPU 121. The storage 123 stores an application program (hereinafter, also referred to as a "live concert viewing application") for viewing a live concert video distributed from the server 12.

The display section 124 includes a display panel such as a liquid crystal panel or an organic electroluminescent (EL) panel, and is configured to display an image before the eyes of a user who is wearing the HMD 100. The display section 124 may realize a stereoscopic vision by displaying a pair of stereo images in regions corresponding to left and right eyes. The display section 124 may further include a pair of lenses that are positioned between the display panel and the user's eyes when the user is wearing the HMD 100 and that enlarge the viewing angle of the user.

The sound output section 126 includes a loudspeaker or an earphone that is provided at a position corresponding to an ear of a user when the user is wearing the HMD 100. The sound output section 126 makes the user hear a sound.

The communication section 132 includes a peripheral device interface such as a universal serial bus (USB) or Institute of Electrical and Electronics Engineers (IEEE) 1394 and a network interface for a wired LAN or a wireless LAN, for example. The communication section 132 exchanges data with the server 12 via an access point (not depicted). For example, the communication section 132 may establish connection with the access point by a known wireless communication technology such as Wi-Fi (registered trademark), and may communicate with the server 12 via the access point. In addition, by using a known wireless communication technology, the communication section 132 communicates with a controller (not depicted) held in a user's hand.

The motion sensor 134 includes a gyro sensor and an acceleration sensor, and obtains an angular velocity and an acceleration of the HMD 100. The microphone 136 receives a sound generated in the surrounding area of the user and a sound made by the user, and converts these sounds into electric signals (also referred to as "sound data").

As depicted in FIG. 2, the stereo camera 110 is a pair of video cameras that photograph a surrounding real space from left and right viewpoints within a visual field that corresponds to the visual point of the user. Hereinafter, an image of a surrounding space of the user photographed by the stereo camera 110 is also referred to as a "camera image." The camera image is regarded as an image including an object that is present in the visual line direction of the user (typically, the front side of the user). A measurement value obtained by the motion sensor 134 and data regarding an image captured by the stereo camera 110 (the camera image) are transmitted to the server 12, if needed, via the communication section 132. It is to be noted that the number of cameras installed in the HMD 100 is not limitative. One camera may be installed, or three or more cameras may be installed.

Figure 4:
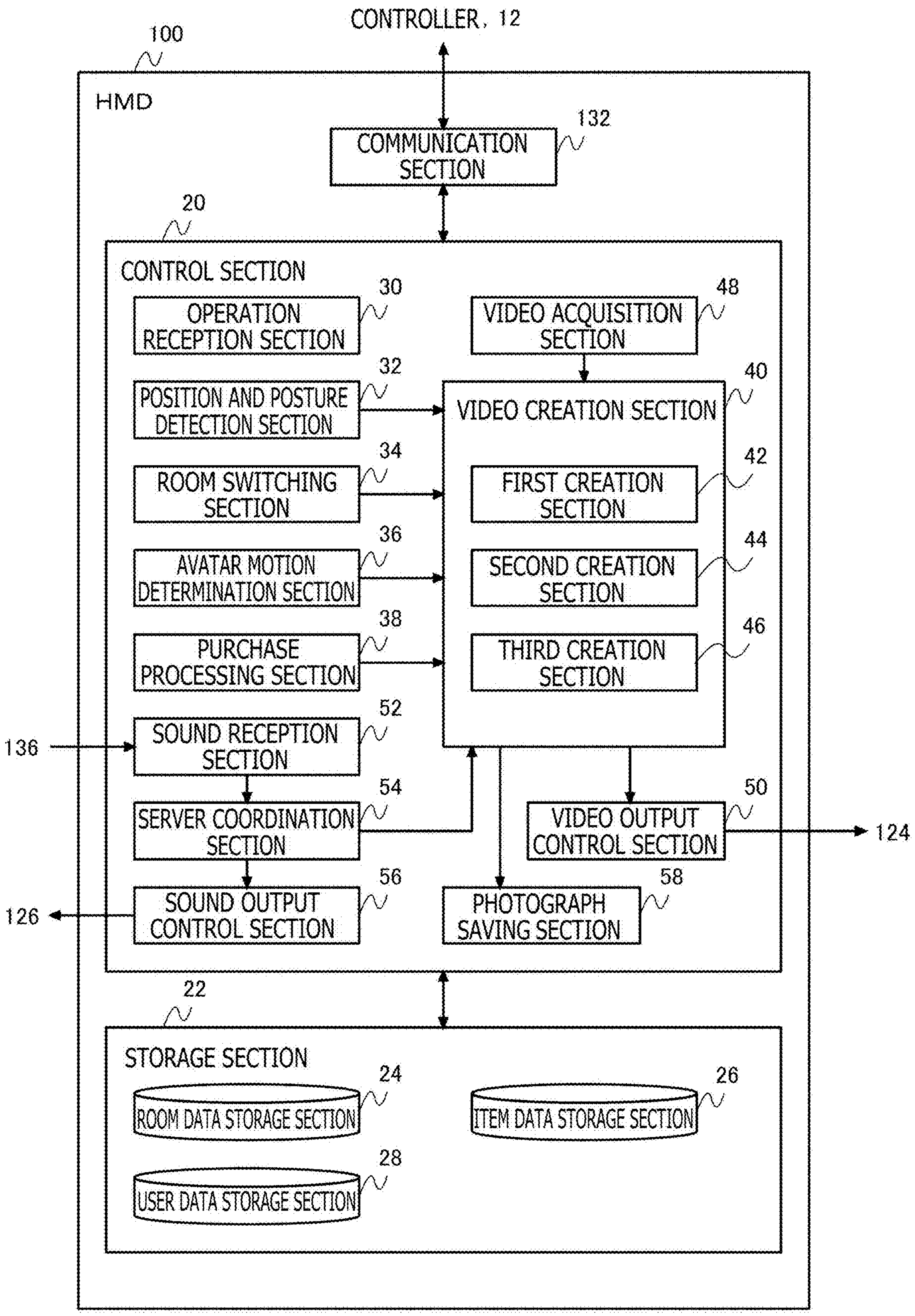
FIG. 4 is a block diagram depicting functional blocks of the HMD in FIG. 1.

FIG. 4 is a block diagram depicting functional blocks of the HMD 100 in FIG. 1. The plurality of functional blocks depicted in the block diagrams of the present description can be implemented by a processor (e.g., a CPU, a GPU, or the like), a memory, or a storage of a computer in terms of hardware, and can be implemented by a computer program having the functions of the plurality of functional blocks in terms of software. Therefore, a person skilled in the art will understand that these functional blocks can be implemented in many different ways by hardware, by software, or a combination thereof, and that implementation of the functional blocks is not limited to a particular way.

The HMD 100 includes a control section 20, a storage section 22, and a communication section 132. The control section 20 may be realized by the CPU 120 and the GPU 121, and executes a variety of data processing. The control section 20 exchanges data with an external device (e.g., the controller or the server 12) via the communication section 132. The storage section 22 may be realized by the main memory 122 and the storage 123, and stores data to be referred to or to be updated by the control section 20.

The storage section 22 includes a room data storage section 24, an item data storage section 26, and a user data storage section 28. The room data storage section 24 stores data (also referred to as "room data") regarding a plurality of virtual spaces for situations before, while, and after a live concert video is played. For example, the room data includes data for defining the layout, shape, pattern, color, etc., of each of the virtual spaces.

The plurality of virtual spaces according to the embodiment include a pre-playing lobby which is a first room, a live concert place which is a second room, and a post-playing lobby which is a third room. The pre-playing lobby is a virtual space where a plurality of users who are to view a live concert video gather before the live concert video is played. For example, in the pre-playing lobby, a user learns in advance a manner of enjoying the live concert (for example, how to move and how to cheer) through a voice chat with others in the same group.

The live concert place is a virtual space where the live concert video is played and a plurality of users view the live concert video. The post-playing lobby is a virtual space where a plurality of users who have viewed the live concert video gather after the live concert video is played. For example, in the post-playing lobby, a user shares the impression of the live concert with others of the same group through a voice chat, and enjoys the afterglow of the live concert. The pre-playing lobby and the post-playing lobby may be virtual spaces of the same lobby, and may have the same layout, shape, pattern, color, etc.

In addition, a plurality of avatars corresponding to a plurality of users appear in each of the pre-playing lobby, the live concert place, and the post-playing lobby. In the embodiment, an action that can be executed by an avatar of a user in the pre-playing lobby is different from an action that can be executed by the avatar of the user in the post-playing lobby. Specifically, the avatar of the user in the pre-playing lobby can purchase an item for cheering, according to a user operation, and can further practice a moving manner and a cheering manner in the live concert by using a handclap and the item. On the other hand, the avatar of the user in the post-playing lobby can view or purchase a photograph of the live concert according to a user operation.

The item data storage section 26 stores data (also referred to as "item data") regarding a plurality of items which are virtual items that can be purchased by the user and which can be used by the avatar of the user. For example, the item data includes data for defining the price of an item and an effect to be exerted by the item and data for defining a performer for whom the item is used to cheer.

The user data storage section 28 stores data (also referred to as "user data") regarding the user who is wearing the HMD 100. For example, the user data includes identification information regarding the user, identification information regarding a group to which the user belongs, and data regarding an item possessed (purchased) by the user. It is to be noted that, in the embodiment, up to four users can belong to each group.

The control section 20 includes an operation reception section 30, a position and posture detection section 32, a room switching section 34, an avatar motion determination section 36, a purchase processing section 38, a video creation section 40, a video acquisition section 48, a video output control section 50, a sound reception section 52, a server coordination section 54, a sound output control section 56, and a photograph saving section 58. The functions of these functional blocks may be installed in the live concert viewing application. By reading out the live concert viewing application into the main memory 122 and executing the live concert viewing application, the processors (the CPU 120 and the GPU 121) of the HMD 100 may exert the functions of the functional blocks in the control section 20.

The operation reception section 30 receives data indicating an operation inputted by the user through the controller. The operation reception section 30 transfers the data indicating the user operation to the functional blocks in the control section 20.

The position and posture detection section 32 detects the position and the posture of the head of the user who is wearing the HMD 100, on the basis of the angular velocity and the acceleration of the HMD 100 detected by the motion sensor 134 and an image of the surrounding area of the HMD 100 captured by the stereo camera 110. The position and posture detection section 31 further detects the viewpoint position and the visual line direction of the user on the basis of the position and the posture of the head of the user.

The room switching section 34 executes a process of switching a virtual space to be displayed, or a virtual space a video of which is to be created. For example, prior to a play timing of a live concert video, the room switching section 34 gives the video creation section 40 a command to create a pre-playing lobby video. Moreover, in response to a command transmitted from the server 12, the room switching section 34 gives the video creation section 40 a command to create a live concert place video in place of the pre-playing lobby video. In addition, in response to a command transmitted from the server 12, the room switching section 34 gives the video creation section 40 a command to create a post-playing lobby video in place of the live concert place video.

The avatar motion determination section 36 determines a posture, a motion, an action of the avatar of the user to be implemented, according to a user operation received by the operation reception section 30 and the position and the posture of the user head detected by the position and posture detection section 32.

The purchase processing section 38 executes an item purchase process according to a user operation received by the operation reception section 30. For example, in coordination with an external payment system, the purchase processing section 38 may settle payment for an item purchased by the user in a pre-playing lobby, by using payment means information (e.g., a credit card number) which is registered by the user in advance.

The video creation section 40 creates virtual space video data. The video creation section 40 includes a first creation section 42, a second creation section 44, and a third creation section 46. The first creation section 42 creates video data regarding the pre-playing lobby by using data regarding the pre-playing lobby stored in the room data storage section 24. The second creation section 44 creates video data regarding the live concert place by using data regarding the live concert place stored in the room data storage section 24. The third creation section 46 creates video data regarding the post-playing lobby by using data regarding the post-playing lobby stored in the room data storage section 24.

The video output control section 50 outputs the pre-playing lobby video data created by the first creation section 42, the live concert place video data created by the second creation section 44, and the post-playing lobby video data created by the third creation section 46, sequentially to the display section 124. The video output control section 50 displays the pre-playing lobby video, the live concert place video, and the post-playing lobby video sequentially on the display section 124.

The video acquisition section 48 receives video data regarding a live concert video transmitted from the server 12. The second creation section 44 sets, on a screen part placed in the live concert place, video data regarding the live concert video received by the video acquisition section 48.

The sound reception section 52 receives sound data inputted through the microphone 136. The server coordination section 54 exchanges data with the server 12. Specifically, the server coordination section 54 transmits, to the server 12, user sound data inputted through the microphone 136. The server coordination section 54 further transmits, to the server 12, the posture, the motion, and the action of the avatar of the user determined by the avatar motion determination section 36.

In addition, the server coordination section 54 receives other user (another user in the same group in the embodiment) sound data transmitted from the server 12, and transfers the other user sound data to the sound output control section 56. Through the sound output section 126, the sound output control section 56 outputs a sound indicated by the other user sound data transmitted from the server 12.

In addition, the server coordination section 54 receives data indicating a posture, a motion, and an action of an avatar of the other user transmitted from the server 12, and transfers the data to the video creation section 40. The first creation section 42, the second creation section 44, and the third creation section 46 of the video creation section 40 each reflect, in the respective VR videos, the posture, the motion, and the action of the avatar of the user determined by the avatar motion determination section 36, and further reflect, in the respective VR videos, the posture, the motion, and the action of the avatar of the other user transmitted from the server 12. Accordingly, the avatar of the user (a user in a local environment) is made to move according to the user's posture, motion, and operation, while the avatar of the other user (a user in a remote environment) is made to move according to the other user's posture, motion, and operation.

The photograph saving section 58 saves data regarding a photograph of a live concert or a live concert place to the storage section 22 (for example, a photograph storage section) according to a user operation.

Figure 5:
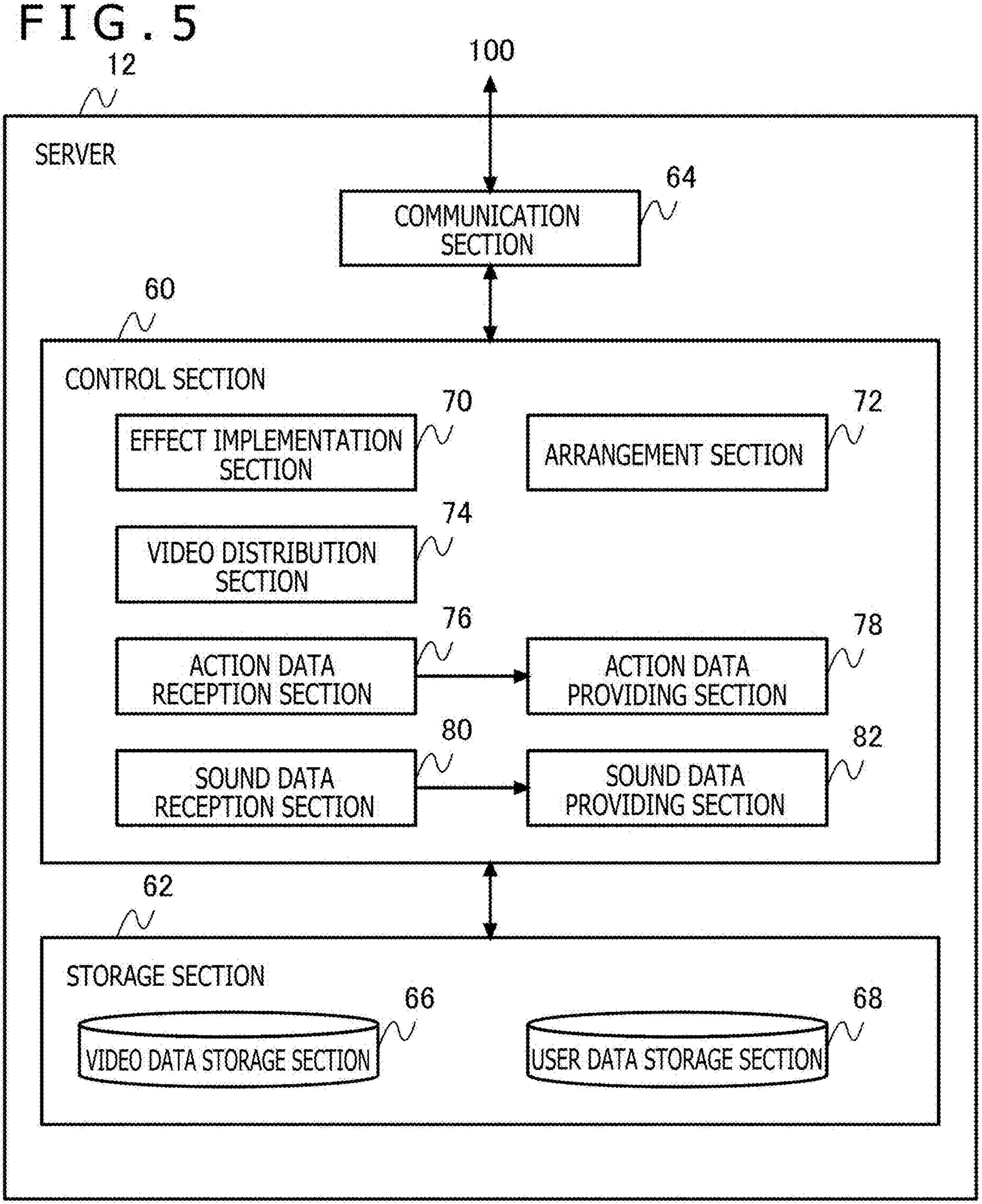
FIG. 5 is a block diagram depicting functional blocks of a server in FIG. 1.

FIG. 5 is a block diagram depicting functional blocks of the server 12 in FIG. 1. The server 12 includes a control section 60, a storage section 62, and a communication section 64. The control section 60 executes a variety of data processing. The storage section 62 stores data to be referred to or to be updated by the control section 60. The communication section 64 communicates with an external device in accordance with a predetermined communication protocol. The control section 60 exchanges data with the HMDs 100 via the communication section 64.

The storage section 62 includes a video data storage section 66 and a user data storage section 68. The video data storage section 66 stores various kinds of video data (which include video data regarding a live concert video in the embodiment) distributed from the server 12 to the HMDs 100.

The user data storage section 68 stores data regarding a plurality of users to whom video content is distributed and who belong to a plurality of groups. Data regarding each user includes identification information regarding the user, identification information regarding the group to which the user belongs, and identification information regarding video content which the user views, for example.

The control section 60 includes an effect implementation section 70, an arrangement section 72, a video distribution section 74, an action data reception section 76, an action data providing section 78, a sound data reception section 80, and a sound data providing section 82. The functions of the plurality of functional blocks may be installed in a computer program and installed into a storage of the server 12. The processors (the CPU, for example) of the server 12 may exert the functions of the plurality of functional blocks of the control section 60 by reading the computer program into the main memory.

The effect implementation section 70 determines effects in the pre-playing lobby, the live concert place, and the post-playing lobby. The effect implementation section 70 transmits data indicating what effect has been determined, to each of the HMDs 100 of a plurality of users viewing the live concert video.

The arrangement section 72 determines the respective positions of the plurality of users viewing the live concert video, on the basis of the groups of the users stored in the user data storage section 68. In other words, the arrangement section 72 determines the positions of the users in a virtual space (the live concert place in the embodiment) according to the groups of the users. The arrangement section 72 transmits data indicating the respective positions of the users to the respective HMDs 100 of the users.

The video distribution section 74 transmits video data regarding the live concert video stored in the video data storage section 66, to the respective HMDs 100 of the plurality of users viewing the live concert video. The video data regarding the live concert video may be transferred and reproduced by streaming.

The action data reception section 76 receives data indicating postures, motions, and actions of avatars of the plurality of users transmitted from the respective HMDs 100 of the users viewing the live concert video. The action data providing section 78 transmits data indicating the corresponding posture, motion, and action of an avatar of a certain user received by the action data reception section 76, to the HMD 100 of another user.

The sound data reception section 80 receives sound data transmitted from the respective HMDs 100 of the plurality of users viewing the live concert video. The sound data providing section 82 identifies a group to which a user having transmitted sound data received by the sound data reception section 80 belongs, by making reference to the data stored in the user data storage section 68. The sound data providing section 82 transmits sound data transmitted from a user belonging to a certain group, to the HMD 100 of another user belonging to the same group, but does not transmit the sound data to the HMD 100 of a user belonging to a different group.

Figure 6:
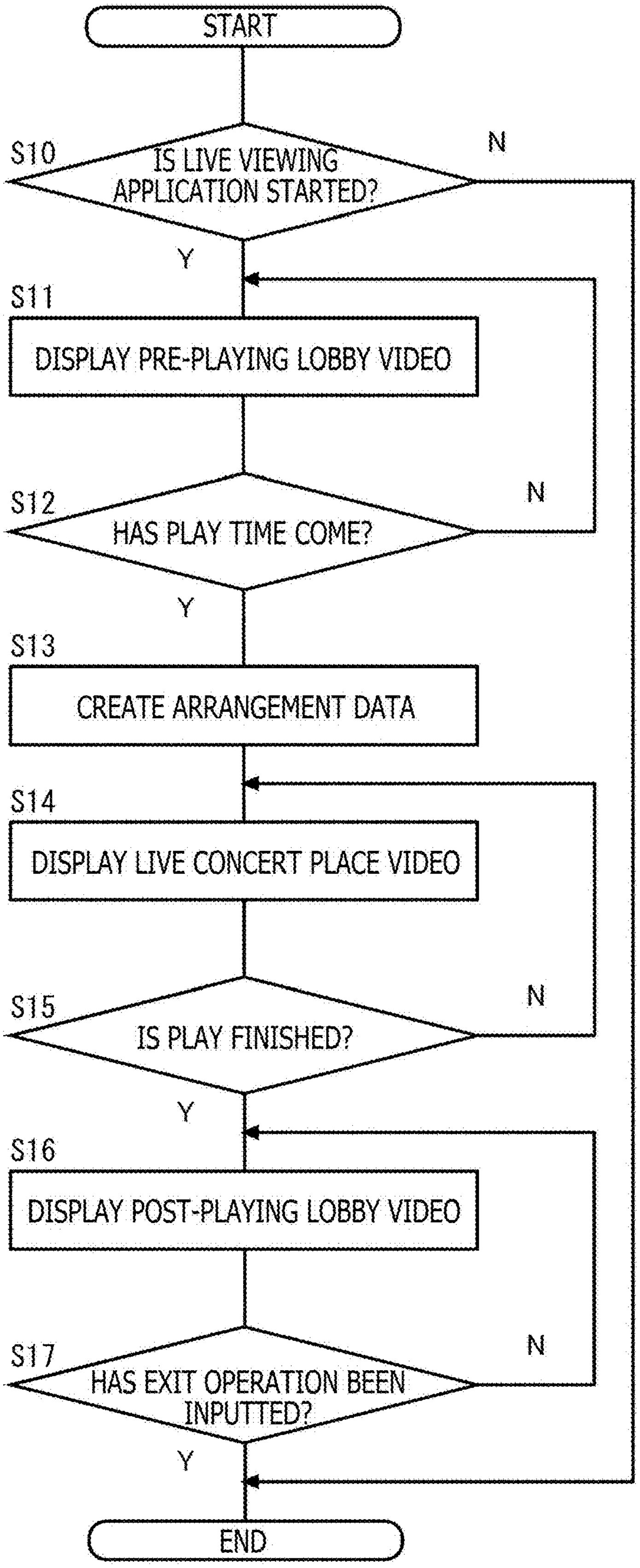
FIG. 6 is a flowchart of operations in the content viewing system.

An explanation will be given of operations in the content viewing system 10 which has the above configuration. FIG. 6 is a flowchart of operations in the content viewing system 10. Hereinafter, operations of the server 12 and the HMD 100*a* that is used by a user a when the user a views a live concert video will be mainly explained. Operations of the other HMDs 100 are the same as that of the HMD 100*a*. The user a belongs to a group A. A user b using the HMD 100*b*, a user c using the HMD 100*c*, and a user d using the HMD 100*d* also belong to the group A. Meanwhile, a user e using the HMD 100*e* and a user f using the HMD 100*f* belong to a group B that is different from the group A.

The user a inputs, to the HMD 100*a*, an operation to start the live concert viewing application, and the control section 20 of the HMD 100*a* starts the live concert viewing application. When the live concert viewing application is started (Y in S10), the user a selects a live concert to view at the moment, from among a plurality of available live concerts (in other words, a plurality of live concert places). In addition, the user a selects a group to join (here, the group A), and inputs a name to log in. The server coordination section 54 of the HMD 100*a* transmits identification information regarding the live concert and the group selected by the user to the server 12. The user data storage section 68 of the server 12 stores the identification information regarding the live concert and the group selected by the user, in association with identification information regarding the user.

The room switching section 34 of the HMD 100*a* gives the video creation section 40 a command to create a pre-playing lobby video. The video creation section 40 (the first creation section 42) of the HMD 100*a* creates data regarding the pre-playing lobby video, and the video output control section 50 displays the pre-playing lobby video on the display section 124 (S11).

Figure 7:
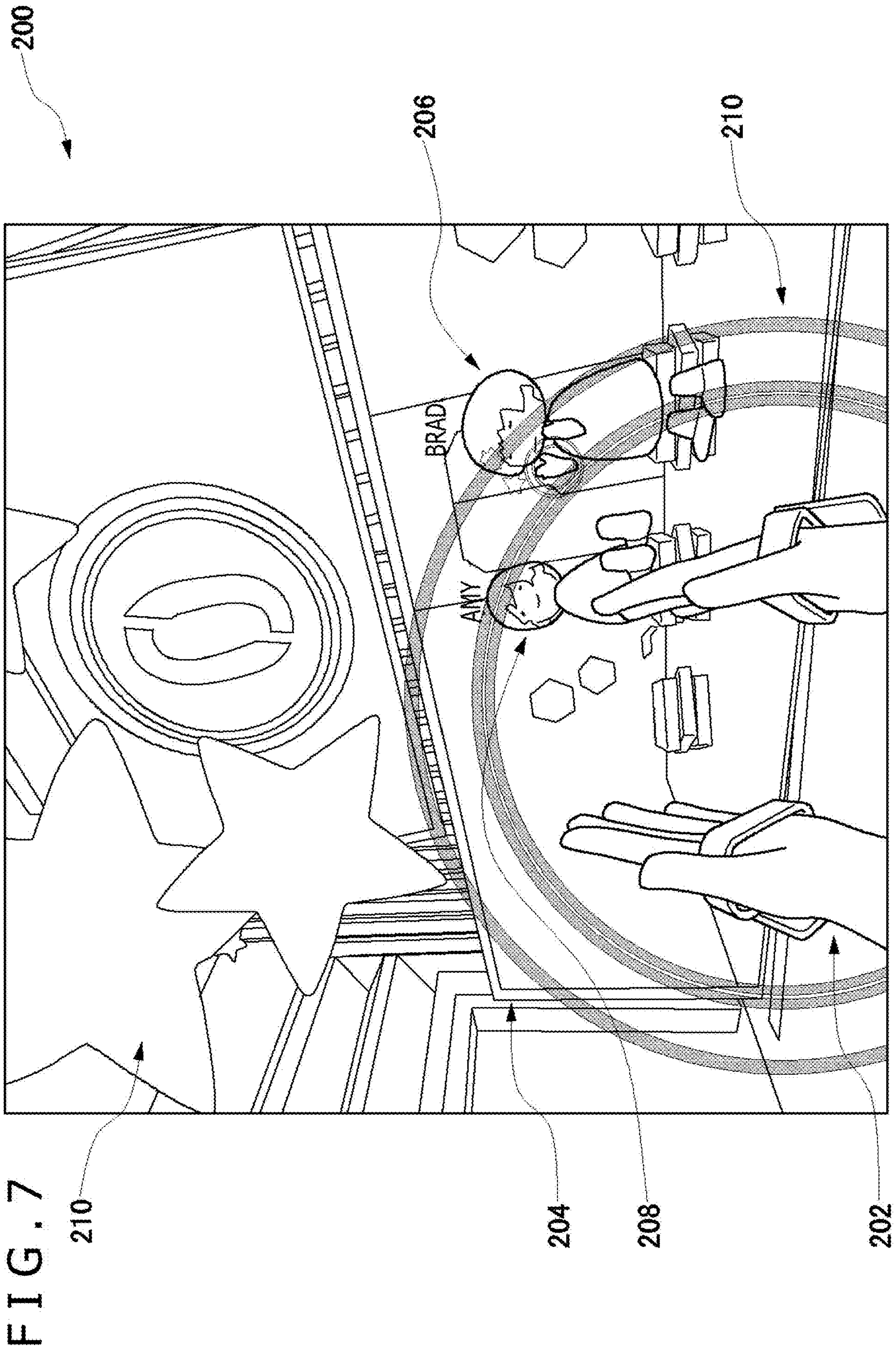
FIG. 7 is a diagram depicting an example of a pre-playing lobby video.

FIG. 7 depicts an example of the pre-playing lobby video. An avatar 202 of the user a is rendered on a pre-playing lobby video 200. Further, a mirror 204 is disposed in the pre-playing lobby. An avatar image 206 of the user a and an avatar image 208 of the user b who have entered the pre-playing lobby are rendered on the mirror 204. Postures, motions, and actions of the avatar 202 and the avatar image 206 of the user a are changed according to a posture, a motion, and an action of the user a in the real world. Also, postures, motions, and actions of an avatar (not depicted) and the avatar image 208 of the user b are changed according to a posture, a motion, and an action of the user b in the real world.

It is to be noted that only the user b, the user c, and the user d who belong to the group A which is the same as that of the user a are allowed to enter the pre-playing lobby where the user a is. On the other hand, the user e and the user f are allowed to enter a pre-playing lobby exclusive for the group B.

In the pre-playing lobby, the user a learns in advance how to move for cheering (here, how to clap hands), while waiting for start of the live concert video. If the user a claps hands in the real world, the operation reception section 30 of the HMD 100 detects the handclap on the basis of movement of the controller or an image captured by the stereo camera 110. The first creation section 42 of the video creation section 40 creates the pre-playing lobby video 200 in which the avatar 202 and the avatar image 206 clap hands, and further creates the pre-playing lobby video 200 that includes an effect 210 that is brought into association with a handclap in advance. The effect 210 includes, for example, an effect of enlarging a ring of light or an effect of flying star-shaped objects (also referred to as particles).

In the pre-playing lobby, the user a can purchase a desired item to be used to cheer for the live concert or a performer, from among a plurality of virtual items stored in the item data storage section 26. The first creation section 42 of the HMD 100*a* creates, as the pre-playing lobby video, a video indicating that the user a purchases an item, according to an operation inputted by the user a. The operation reception section 30 of the HMD 100*a* receives the user operation for indicating purchase of the item. The purchase processing section 38 of the HMD 100*a* settles payment for the item, and causes the user data storage section 28 to store data regarding the purchased item in association with the identification information regarding the user a.

In addition, in the pre-playing lobby, the user a can use the purchased item to practice cheering and moving. The first creation section 42 of the HMD 100*a* creates, as the pre-playing lobby video 200, a video indicating that the avatar 202 and the avatar image 206 of the user a cheer while using the purchased item, according to an operation inputted by the user a. In the embodiment, purchasable items include a frying pan, and a user can practice waving the flying pan in a pre-playing lobby, for example. As long as the play time of the live concert video (in other words, a timing of switching to the live concert place video) does not come (N in S12), the pre-playing lobby video 200 is continuously displayed on the HMDs 100 of the respective users.

When the play time of the live concert video has come (Y in S12), the arrangement section 72 of the server 12 determines the respective positions of a plurality of users who are to view the live concert video in the live concert place, on the basis of the groups of the users (S13). The respective positions of the users in the live concert place are the arrangement positions of the avatars of the users in the live concert place.

Figure 8:
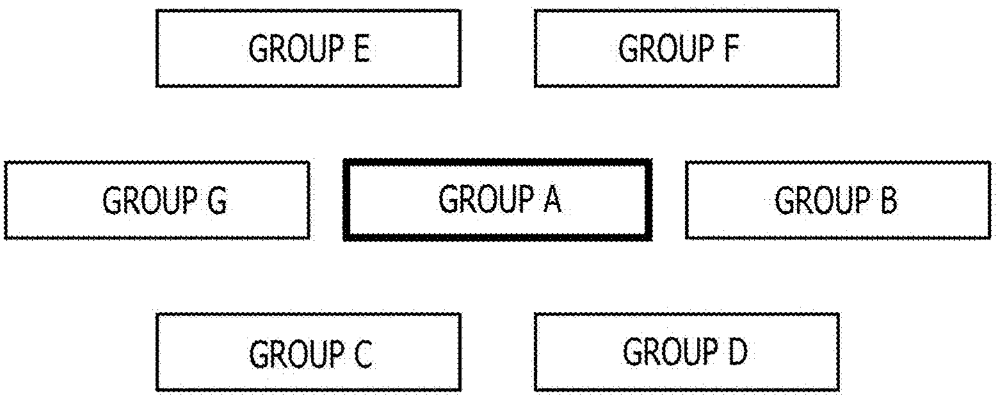
FIG. 8 is a diagram depicting an example of arrangement of groups in a live concert place.
Figure 9:
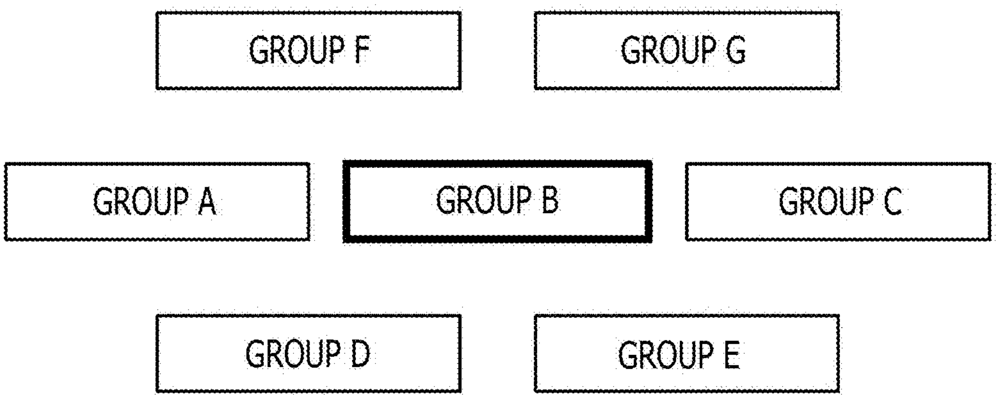
FIG. 9 is a diagram depicting an example of arrangement of the groups in the live concert place.

FIG. 8 depicts an example of arrangement of the groups in the live concert place. FIG. 8 indicates group arrangement to be allocated for the users (the user a, the user b, the user c, and the user d) of the group A. FIG. 9 also depicts an example of arrangement of the groups in the live concert place. FIG. 9 indicates group arrangement to be allocated for the users (the user e and the user f) of the group B. It is to be noted that a screen onto which the live concert video is projected is disposed at the front of the groups in the front row (at the front of a group E and a group F in FIG. 8, and at the front of a group F and a group G in FIG. 9).

As depicted in FIGS. 8 and 9, in the arrangement data allocated for the users of the group A, the arrangement section 72 arranges the group A in a predetermined fixed position in the live concert place, and arranges the other groups in other positions in the live concert place. Further, in the arrangement data allocated for the users of the group B, the arrangement section 72 arranges the group B in the fixed position in the live concert place, and arranges the other groups in other positions in the live concert place. In the embodiment, the fixed position is located in the center portion of the second row. Hereinafter, this position is also referred to as a "viewing position." Thus, the arrangement section 72 allocates, for all the users of the plurality of groups viewing the live concert video, positions that are suitable to viewing the live concert video, in a fixed manner.

In addition, the arrangement section 72 arranges at least one other group between the viewing position (the center portion of the second row in the embodiment) in the live concert place and the play position of the live concert video (the position of the screen onto which the live concert video is projected in the embodiment). In the example in FIG. 8, the group E and the group F are arranged between the viewing position of the group A and the screen. In the example in FIG. 9, the group F and the group G are arranged between the viewing position of the group B and the screen. As a result, each of the users can enjoy the performance of an artist while checking the behaviors of avatars of the other groups.

In addition, the arrangement section 72 keeps the positional relation between the group A and the group B consistent between the arrangement data allocated for the users of the group A and the arrangement data allocated for the users of the group B. That is, the arrangement section 72 ensures the consistency in the relative positions of the groups between the pieces of arrangement data allocated for the respective groups. For example, both in the group arrangement depicted in FIG. 8 and in the group arrangement depicted in FIG. 9, the group B is positioned on the right side of the group A while the group F is positioned on the diagonally right front side of the group A and on the diagonally left front side of the group B. Accordingly, the consistency of communication between groups (which will be explained later) can easily be maintained.

After the positions of the respective groups are determined by the arrangement section 72, the effect implementation section 70 of the server 12 transmits, to the HMDs 100 of the respective users, a command for switching to the live concert place which includes the arrangement data for the corresponding groups. On the basis of the command transmitted from the server 12, the room switching section 34 of the HMD 100*a* inputs, to the video creation section 40, a command for switching to the live concert place which includes the arrangement data for the group A. The video creation section 40 (the second creation section 44) creates data regarding a live concert place video in which the avatars of the groups are arranged in the positions indicated by the arrangement data for the group A (for example, FIG. 8). The video output control section 50 displays the live concert place video on the display section 124 (S14).

Figure 10:
FIG. 10 is a diagram depicting an example of a live concert place video.

FIG. 10 depicts an example of the live concert place video. The avatar 202 of the user a is rendered on a live concert place video 220. In addition, a screen 222 on which the live concert video is set is disposed in the live concert place. An avatar 224 is an avatar of a user who belongs to a group (for example, the group F in FIG. 8) that is different from the group of the user a.

In the live concert place, the user a can perform non-verbal communication with users belonging to the other groups. The non-verbal communication includes waving a hand to an avatar of a user belonging to another group and throwing an object (also referred to as particles) toward the user. For example, in FIG. 10, the avatar 202 of the user a throws a heart-shaped object 226 toward the avatar 224 of the user of the different group. This motion of the avatar 202 of the user a is transmitted to the HMD 100 of the other user via the server 12, and this motion is reflected in the live concert place video 220 on the HMD 100 of the other user.

As previously explained, the relative positions of the groups are kept consistent between the pieces of arrangement data allocated for the respective groups, whereby consistency in non-verbal communication between the groups can be ensured. For example, in a case where a user of the group A throws the object 226 toward the right direction (that is, to the direction of the group B), a user of the group B can recognize that the object 226 is thrown from the left direction (that is, from the direction of the group A).

Avatars of the remaining users (the user B, the user C, and the user D) belonging to the group A which is the same as the group to which the user a belongs are not depicted in FIG. 10, but are also be rendered on the live concert place video 220. The user a can perform both non-verbal communication and verbal communication with the other users of the same group. Specifically, the verbal communication is a voice chat. The sound data providing section 82 of the server 12 transmits a sound made by the user a, b, c, or d to the HMDs 100 of the remaining users of the group A, but does not transmit the sound to the HMDs 100 of users who do not belong to the group A. In addition, the sound data providing section 82 transmits a sound made by the user e or f to the HMDs 100 of the other users of the group B, but does not transmit the sound to the HMDs 100 of the users who do not belong to the group B. Since transmission of sounds to a different group is shut off in this manner, a situation where a user feels that sounds of a different group are hindrance can be avoided.

Figure 11:
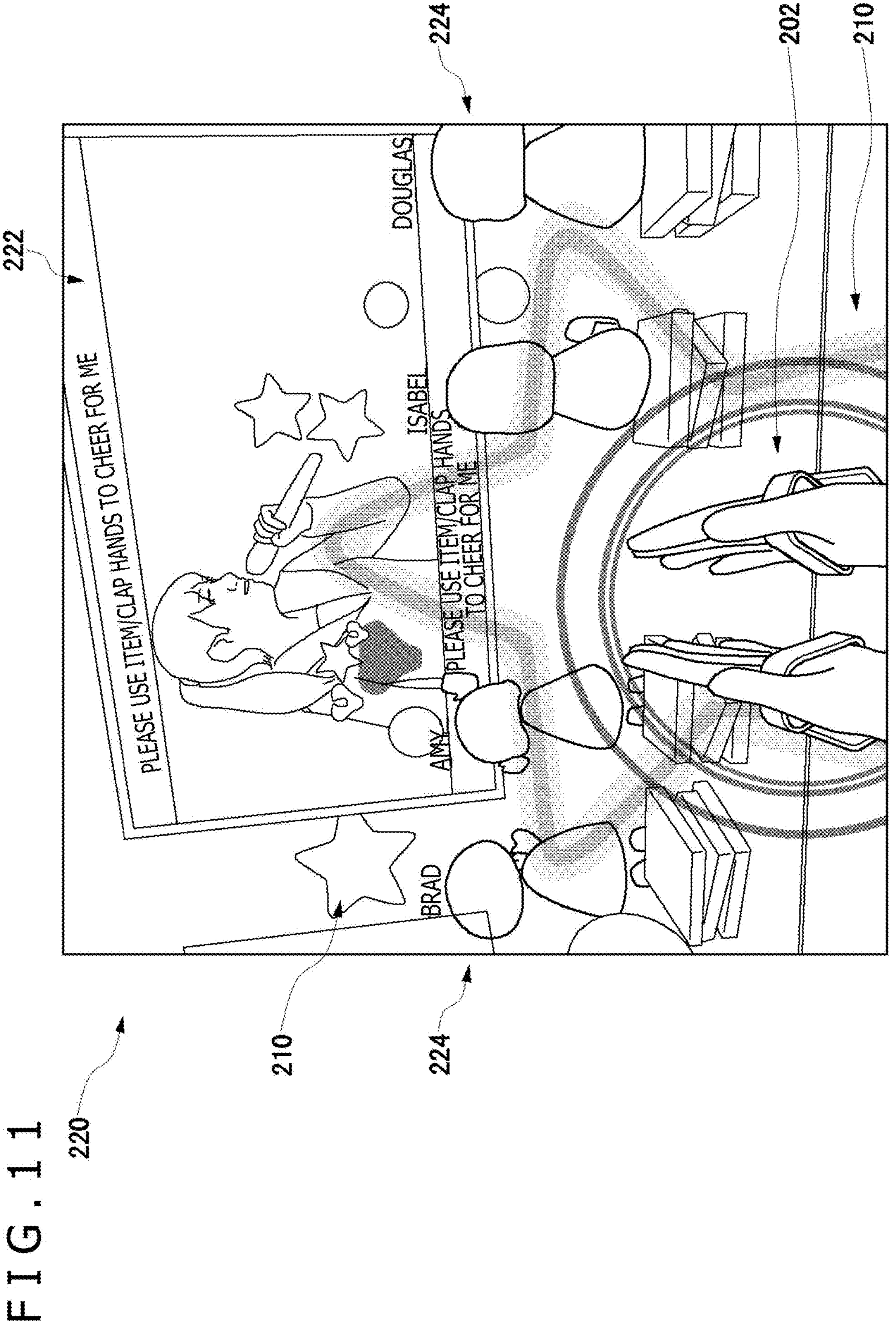
FIG. 11 is a diagram depicting an example of the live concert place video.

FIG. 11 also depicts an example of the live concert place video. The user a claps hands to cheer for an artist while viewing the live concert video. The avatar 202 of the user a in the live concert place video 220 claps hands in synchronization with motion of the user a. In conjunction with the handclap of the avatar 202, the effect 210 (particles, for example) is rendered on the live concert place video 220. It is to be noted that the action data providing section 78 of the server 12 reports motion of the avatar of another user to the HMD 100*a*, and the second creation section 44 of the HMD 100*a* further displays the motion of the avatar 224 of the other user on the live concert place video 220.

Figure 12:
FIG. 12 is a diagram depicting an example of the live concert place video.

FIG. 12 also depicts an example of the live concert place video. According to an operation inputted by the user a, the second creation section 44 of the HMD 100*a* creates, as the live concert place video 220, a video indicating that an item (here, an item 228) purchased in the pre-playing lobby is being used by the avatar 202 of the user a.

As previously explained, an item purchased in a pre-playing lobby is associated with a person or a character (here, referred to as a "performer") who appears in a live concert video. In a case where the item purchased in the pre-playing lobby is used by the avatar of the user, the second creation section 44 of the HMD 100*a* creates the live concert place video 220 that includes an action (which can be regarded as a reaction or a feedback) that is taken by the performer associated with the item, to respond to the user.

Specifically, the effect implementation section 70 of the server 12 identifies items that are being used by the avatars of the respective users in the live concert place, on the basis of data indicating the motions of the avatars of the respective users reported from the HMDs 100 of the respective users. In other words, for each of the items, the effect implementation section 70 identifies the user who is using the item.

For each of the items, the effect implementation section 70 determines, by lot, one user, as a target of a reaction effect (which can be also regarded as a gratitude effect) to be made by the performer associated with the item, from among users who are using the item. The effect implementation section 70 transmits, to the HMD 100 of the respective users, a reaction effect command for specifying the reaction effect target user determined for each item.

The second creation section 44 of the HMD 100 creates the live concert place video 220 that indicates the reaction of the performer to the avatar of the user specified by the reaction effect command. In the live concert place video 220 in FIG. 12, as a reaction effect, a reaction object 230 that indicates a performer associated with the item 228 is delivered to the avatar 202 of the user a who is using the item 228. It is to be noted that, in a case where another user is determined as the reaction effect target user of the item 228, the live concert place video 220 for the user a indicates that the reaction object 230 is delivered to the avatar of the other user.

With such a reaction effect, purchase of items in the post-playing lobby can be promoted, and further, competition among the users can be promoted to enhance the attractiveness of the live concert viewing. A reaction effect is regularly repeated. The same user may be determined as a reaction effect target multiple times. Alternatively, a user determined as reaction effect target may be changed each time.

As long as play of the live concert video is not finished (N in S15), the live concert place video 220 is continuously displayed on the HMDs 100 of the respective users. If play of the live concert video is finished (Y in S15), the effect implementation section 70 of the server 12 transmits a command for switching to the post-playing lobby to the HMDs 100 of the respective users. In accordance with the command sent from the server 12, the room switching section 34 of the HMD 100*a* inputs a command for switching to the post-playing lobby to the video creation section 40. The video creation section 40 (the third creation section 46) creates data regarding the post-playing lobby video. The video output control section 50 displays the post-playing lobby video on the display section 124 (S16).

Figure 13:
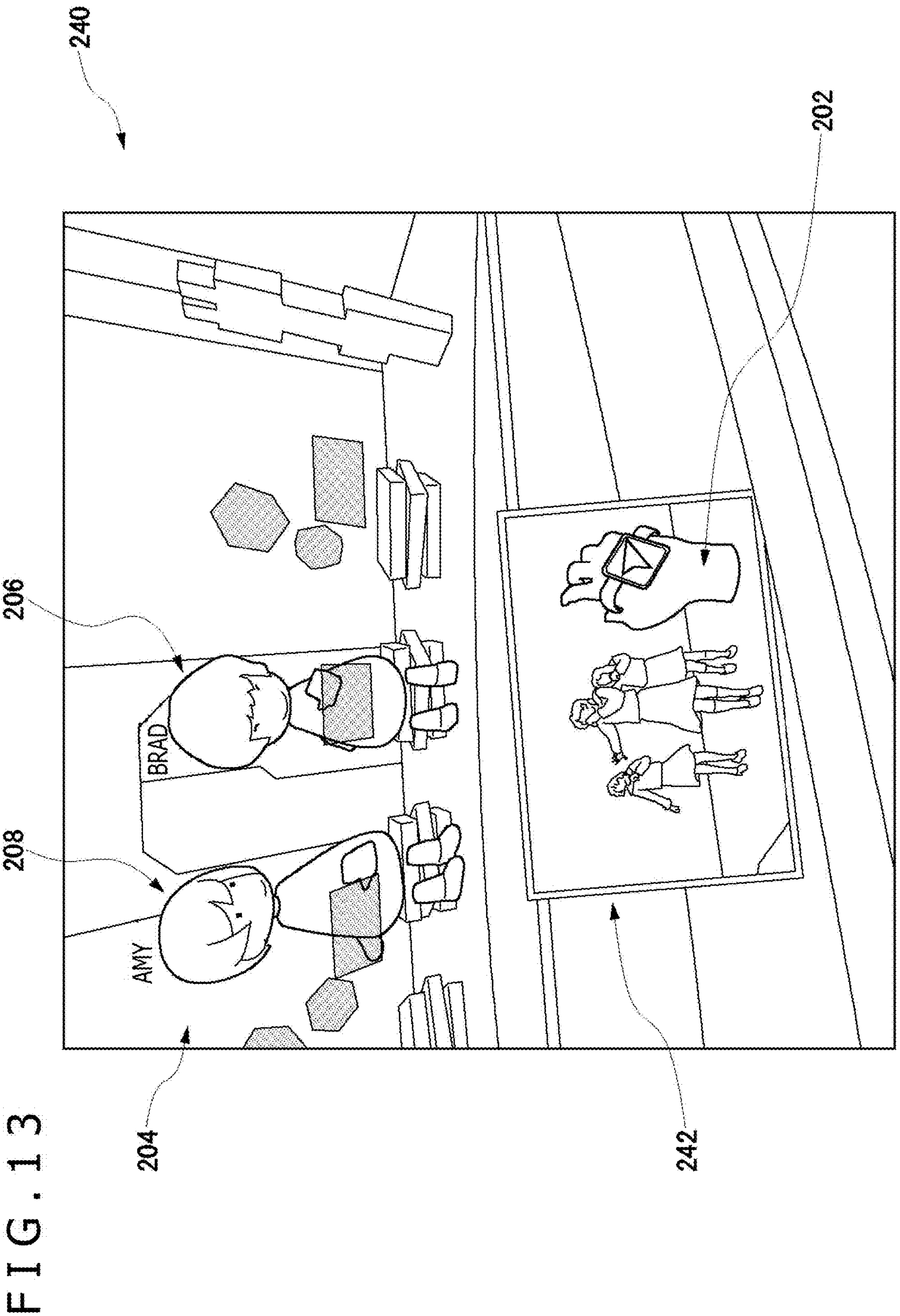
FIG. 13 is a diagram depicting an example of a post-playing lobby video.

FIG. 13 is an example of the post-playing lobby video. The avatar 202 of the user a is rendered on a post-playing lobby video 240. In addition, the mirror 204 which is the same as that in the pre-playing lobby is also disposed in the post-playing lobby. The avatar image 206 of the user a and the avatar image 208 of the user b who have entered the post-playing lobby are rendered on the mirror 204. Only the user b, the user c, and the user d who belong to the group A which is the same as that of the user a are allowed to enter the post-playing lobby that the user a enters. The user e and the user f are allowed to enter a post-playing lobby exclusive for the group B.

In the post-playing lobby, while sharing the impressions and the like of the live concert video with the others of the group A through a voice chat, the user a can cause the avatar 202 to hold a plurality of photographs 242 of a plurality of scenes of the video content (here, a live concert) with its hand to check the photographs 242. Data regarding the photographs 242 may be created by the effect implementation section 70 of the server 12, and may be provided from the server 12 to the HMDs 100 of the respective users. The third creation section 46 of the HMD 100 may display, on the post-playing lobby video 240, the photographs 242 provided from the server 12.

Figure 14:
FIG. 14 is a diagram depicting an example of a photograph which is offered in a post-playing lobby.

FIG. 14 depicts an example of a photograph that is provided in the post-playing lobby. The photographs 242 provided in the post-playing lobby may include a photograph including the avatar 202 of the user a in the live concert place, and may include a photograph including both the performer and the avatar 202 in the live concert place. The photograph saving section 58 of the HMD 100*a* may save data regarding a photograph taken by a virtual preset camera in the live concert place or a virtual camera set in the live concert place by the user a, into the storage section 22 (for example, the photograph storage section). The user a may input a predetermined operation for the virtual camera, to cause the virtual camera to capture an image of a range including the avatar of the user a, the avatar of another user, and the screen. The third creation section 46 of the HMD 100*a* may display, on the post-playing lobby video 240, a photograph captured according to an operation inputted by the user a and stored in the storage section 22 (for example, the photograph storage section).

In the post-playing lobby, the user a can purchase a desired one of a plurality of the photographs 242 (which include a photograph including the avatar of the user a). According to an operation inputted by the user a, the third creation section 46 of the HMD 100*a* creates, as the post-playing lobby video, a video indicating that the user a purchases the photograph 242. In response to a user operation for indicating purchase of the photograph 242, the purchase processing section 38 of the HMD 100*a* settles payment for the photograph 242, and stores data (identification information, image data, or the like) regarding the purchased photograph 242 in association with the identification information regarding the user a in the user data storage section 28.

It is to be noted that, according to an action of a certain user in the live concert place, an action that can be executed by the user in the post-playing lobby may be changed. For example, when the post-playing lobby is displayed, the effect implementation section 70 of the server 12 may provide a photograph of a live concert scene or the live concert place to the HMD 100*a* on condition that the number of times of cheering by the avatar of the user a in the live concert place (e.g., the total number of the number of handclaps and the number of times of using items) is equal to or greater than a predetermined threshold. Accordingly, a privilege to view photographs in the post-playing lobby can be given to a user whose number of times of cheering in the live concert place is large. In addition, when the post-playing lobby is displayed, the effect implementation section 70 of the server 12 may provide more photographs to the HMD 100*a* as the number of times of cheering by the avatar of the user a in the live concert place is larger. Accordingly, cheering actions of users in the live concert place can be encouraged.

As long as the user a does not input a predetermined exit operation (N in S17), the post-playing lobby video 240 is continuously displayed. After the user a inputs the exit operation (Y in S17), the flow in FIG. 6 is exited. If the live concert viewing application is not started in the HMD 100*a* (N in S10), the steps from S11 are skipped, and then, the flow in FIG. 6 is exited.

With the content viewing system 10 according to the embodiment, the pre-playing lobby video 200, the live concert place video 220, and the post-playing lobby video 240 are sequentially provided to the users in order to achieve a flow line of users before, while, and after video content is played. Accordingly, an experience that is close to event viewing in a real space can be offered to users, so that the entertainability before, while, and after video content is played can be improved.

The present invention has been explained so far on the basis of the embodiment. The embodiment exemplifies the present invention, and a person skilled in the art will understand that various modifications can be made to a combination of the constituent elements or the process steps of the embodiment and that these modifications are also within the scope of the present invention.

A first modification will be explained. In a virtual space of at least one of the pre-playing lobby, the live concert place, and the post-playing lobby, a special user (here, referred to as a "guide") who has a role of guiding a plurality of general users viewing video content may be prepared, and an avatar of the guide may be arranged. In addition, in a case where pre-playing lobbies and post-playing lobbies are prepared for respective groups, the avatar of the guide may be arranged in the pre-playing lobbies and the post-playing lobbies of the all the groups.

The guide may teach the users how to cheer in the live concert or how to use an item, in a voice chat or by gestures. The sound data providing section 82 of the server 12 may transmit data regarding a sound made by the guide, or sound data transmitted from the HMD 100 of the guide, to the HMDs 100 of the users of a plurality of groups, and may transmit the data to the HMDs 100 of the users of all the groups. In addition, the sound data providing section 82 of the server 12 may transmit the sound data provided from all the users, to the HMD 100 of the guide, irrespective of which group the users belong to.

In this modification, in response to an operation inputted by the guide, a command for video switching (switching from the pre-playing lobby to the live concert place and/or switching from the live concert place to the post-playing lobby) may be transmitted from the HMD 100 of the guide to the HMDs 100 of all the users.

A second modification will be explained. The video creation section 40 may further include a fourth creation section that creates a video of My Room which is a fourth virtual space allocated for each user and in which items that an avatar of the corresponding user can use are gathered. My Room can be regarded as a virtual space associated with each user, and can also be regarded as a virtual space where items purchased by the corresponding user are gathered. The fourth creation section of the video creation section 40 may create, as a video of a virtual space to be initially displayed when the live concert viewing application is started, a video of My Room where one or more purchased items stored in the user data storage section 28 are arranged. The video output control section 50 may display the video of My Room on the display section 124.

In My Room, the user can freely view the purchased items. In addition, information regarding a plurality of pieces of video content that can be viewed at the moment is indicated in My Room. In My Room, in a case where the user inputs an operation for selecting video content to view at the moment, the room switching section 34 of the HMD 100 causes the video creation section 40 to display a pre-playing lobby corresponding to the selected video content. In addition, the server coordination section 54 of the HMD 100 may transmit, to the server 12, data (distribution request data) indicating the video content selected by the user. Thereafter, steps from S11 in the flowchart in FIG. 6 may be executed.

A third modification will be explained. A live concert video of a concert or the like is distributed from the server 12 to the HMDs 100 in the above embodiment, but the server 12 may distribute video content of any other type to the HMDs 100. Video content to be distributed may be a live sports broadcast video of a baseball match, a soccer match, or the like, or may be a video of a film or drama, for example. In a case where a video of a film or drama is distributed, it is preferable that the on/off of a voice chat be switchable according to a user operation. For example, the sound data providing section 82 of the server 12 may switch the on/off of a voice chat in a group according to a user setting, that is, may refrain from transferring sound data between users even if the users belong to the same group.

A fourth modification will be explained. Some of the plurality of functions of the HMD 100 according to the embodiment may be included in the server 12. Also, some of the plurality of functions of the server 12 according to the embodiment may be included in the HMD 100. Alternatively, some of the plurality of functions of the HMD 100 according to the embodiment and/or some of the plurality of functions of the server 12 according to the embodiment may be included in a user-side information processing device (e.g., a game console or the like) that has connection with the HMD 100.

Any combination of the above embodiment and any one of the modifications is also effective as an embodiment of the present disclosure. A new embodiment provided by such a combination provides the effects of the combined embodiment and modification. In addition, a person skilled in the art will understand that a function to be exerted by each constituent feature set forth in the claims is implemented by each constituent element described in the embodiment or modifications alone, or is implemented by collaboration between the constituent elements.

The technical concept based on the embodiment and the modifications can be expressed by the following aspects. An information processing system according to the following items can also be expressed as an information processing device or a head-mounted display.

[Item 1]

An information processing system including:

a first creation section that creates a video of a first room which is a virtual space where a plurality of users who are to view predetermined content gather before the content is played;

a second creation section that creates a video of a second room which is a virtual space where the content is played;

a third video creation section that creates a video of a third room which is a virtual space where the plurality of users gather after the content is played; and an output section that displays the video of the first room, the video of the second room, and the video of the third room sequentially on a display section.

With the information processing system, the first room before the content is played, the second room while the content is being played, and the third room after the content is played are sequentially provided to the user. Accordingly, a flow line that is close to a flow line of event viewing in a real space can be offered to the user, and further, an original user experience can be offered.

[Item 2]

The information processing system according to Item 1, in which an action that is able to be executed by an avatar of a user in the first room is different from an action that is able to be executed by the avatar of the user in the third room.

With the information processing system, it makes possible to control the avatar of the user in the first room to execute an action that is suitable before the content is played and control the avatar of the user in the third room to execute an action that is suitable after the content is played. Therefore, an experience that is close to event viewing in the real world can be offered to the user.

[Item 3]

The information processing system according to Item 1 or 2, in which the first creation section creates, as the video of the first room, a video indicating that a user purchases an item, according to a user operation, and the second creation section creates, as the video of the second room, a video indicating that the item purchased in the first room is being used by an avatar of the user, according to a user operation.

With the information processing system, an item can be used while the content is being viewed. Accordingly, sales of items can be promoted. Further, the attractiveness of content viewing can be enhanced.

[Item 4]

The information processing system according to Item 3, in which the item purchased in the first room is associated with a person or a character who appears in the content, and, in a case where the item purchased in the first room is used by the avatar of the user, the second creation section creates a video that includes an action that is taken by the person or the character associated with the item, to respond to the user.

With the information processing system, a privilege to receive an action from the person or the character appearing in the content is offered. Accordingly, sales of items can be further promoted. Further, the attractiveness of content viewing can be further enhanced.

[Item 5]

The information processing system according to any one of Items 1 to 4, in which, according to an action of a certain user in the second room, an action that is able to be executed by the user in the third room is changed.

With the information processing system, after content viewing, a feedback to the action of the user during the content viewing can be offered. Accordingly, the attractiveness during content viewing and the attractiveness after content viewing can be enhanced.

[Item 6]

The information processing system according to any one of Items 1 to 5, in which an image including an avatar of a user captured in the second room is able to be purchased in the third room.

With the information processing system, the attractiveness after content viewing can be enhanced.

[Item 7]

The information processing system according to any one of Items 1 to 6, further including:

an arrangement section that determines positions of respective users in the second room on the basis of groups of the users.

With the information processing system, users of the same group are arranged close to each other. Accordingly, the attractiveness during content viewing can be enhanced.

[Item 8]

The information processing system according to Item 7, in which the arrangement section allocates, for a user of the first group, first arrangement data in which a first group is arranged in a predetermined fixed position in the second room and another group is arranged in another position in the second room, and allocates, for a user of the second group, second arrangement data in which a second group is arranged in the fixed position in the second room and another group is arranged in another position in the second room, such that a positional relation between the first group and the second group is kept consistent between the first arrangement data and the second arrangement data.

With the information processing system, each group is arranged in the fixed position that is suitable for content viewing, and the relative positions of the groups are kept consistent among the pieces of arrangement data allocated for the respective groups. Accordingly, the consistency in communication among the groups can easily be maintained.

[Item 9]

The information processing system according to Item 7, in which the arrangement section allocates, for a user of the first group, first arrangement data in which a first group is arranged in a predetermined fixed position in the second room and another group is arranged in another position in the second room, allocates, for a user of the second group, second arrangement data in which a second group is arranged in the fixed position in the second room and another group is arranged in another position in the second room, and arranges at least one other group between the fixed position and a play position of the content in the second room.

With the information processing system, each group is arranged in the fixed position that is suitable for content viewing, and at least one other group is arranged between the fixed position and the play position of the content. Accordingly, while viewing the content, the user can check a behavior of a different group responding to the content.

[Item 10]

The information processing system according to any one of Items 1 to 9, further including:

a sound providing section that provides data regarding a sound made by a user belonging to a certain group to a device of another user belonging to the same group but does not provide the data to a device of a user belonging to a different group.

With the information processing system, a sound that is unnecessary for the user can be suppressed from being provided to the user.

[Item 11]

The information processing system according to Item 10, in which a special user for guiding the plurality of users is disposed in at least one of the first room, the second room, and the third room, and the sound providing section provides data regarding a sound made by the special user to devices of users of a plurality of groups.

With the information processing system, a sound that is unnecessary for the user is suppressed from being provided to the user, but a sound that is beneficial for a plurality of groups can be exceptionally provided to the plurality of groups.

[Item 12]

The information processing system according to any one of [Item 1] to [Item 11], further including:

a fourth creation section that creates a video of a fourth room which is a virtual space allocated for each user and in which items that are able to be used by an avatar of the user are gathered, in which, in a case where the user in the fourth room selects content to view at the moment, the first creation section creates the video of the first room that corresponds to the selected content.

With the information processing system, the fourth room which is the user's own room for selecting which content to view or for checking collected items can be provided to the user. Accordingly, an experience that is close to that in the real world can be offered to the user.

[Item 13]

An information processing method executed by a computer, the information processing method including:

a step of creating a video of a first room which is a virtual space where a plurality of users who are to view predetermined content gather before the content is played;

a step of creating a video of a second room which is a virtual space where the content is played;

a step of creating a video of a third room which is a virtual space where the plurality of users gather after the content is played; and a step of displaying the video of the first room, the video of the second room, and the video of the third room sequentially on a display section.

With the information processing method, the first room before the content is played, the second room while the content is being played, and the third room after the content is played are sequentially provided to the user. Accordingly, a flow line that is close to a flow line of event viewing in a real space can be realized, and an original user experience can be offered.

[Item 14]

A computer program for causing a computer to implement:

a function of creating a video of a first room which is a virtual space where a plurality of users who are to view predetermined content gather before the content is played;

a function of creating a video of a second room which is a virtual space where the content is played;

a function of creating a video of a third room which is a virtual space where the plurality of users gather after the content is played; and a function of displaying the video of the first room, the video of the second room, and the video of the third room sequentially on a display section.

With the computer program, the first room before the content is played, the second room while the content is being played, and the third room after the content is played are sequentially provided to the user.

Accordingly, a flow line that is close to a flow line of event viewing in the real space can be realized, and an original user experience can be offered.

INDUSTRIAL APPLICABILITY

The technology according to the present disclosure is applicable to an information processing system or an information processing device.

REFERENCE SIGNS LIST

10: Content viewing system
12: Server
40: Video creation section
42: First creation section
44: Second creation section
46: Third creation section
50: Video output control section
72: Arrangement section
82: Sound data providing section
100: HMD
124: Display section

The invention claimed is:

1. An information processing system comprising:

a memory comprising computer-executable instructions; and a processor configured to access the memory and execute the computer-executable instructions to perform operations comprising:

rendering, on a display of the information processing system, a first avatar into a first virtual space before a predetermined content is played, wherein the first avatar corresponds to a user;

in response to determining that the predetermined content is ready to play, rendering, on the display of the information processing system, the first avatar from the first virtual space into a second virtual space while the predetermined content is played; and in response to determining that the predetermined content is finished playing in the second virtual space, rendering, on the display of the information processing system, the first avatar from the second virtual space into a third virtual space after the predetermined content is played, wherein the first virtual space, the second virtual space, and the third virtual space are different from each other.

2. The information processing system of claim 1, further comprising:

executing, by the information processing system, a first action by the first avatar in the first virtual space; and executing, by the information processing system, a second action by the first avatar in the third virtual space that is different from the first action.

3. The information processing system of claim 1, further comprising receiving, by the information processing system, in the first virtual space, a user input requesting an item for use by the first avatar, wherein rendering the first avatar to the second virtual space includes rendering the item for use by the first avatar.

4. The information processing system of claim 3, wherein rendering the item for use by the first avatar includes rendering the first avatar using the item in an action.

5. The information processing system of claim 1, further comprising executing, by the information processing system, a first action by the first avatar in the third virtual space based at least in part on the first avatar having previously performed a second action performed in the second virtual space.

6. The information processing system of claim 1, further comprising receiving, by the information processing system, in the third virtual space, a request for a picture of the first avatar captured in the second virtual space.

7. The information processing system of claim 1, wherein rendering the first avatar to the second virtual space includes rendering the first avatar to a predetermined position in the second virtual space that is allocated specifically for the first avatar.

8. The information processing system of claim 7, wherein the predetermined position is a fixed position in the second virtual space for the first avatar such that the first avatar cannot move within the second virtual space from the fixed position.

9. The information processing system of claim 7, wherein:
the first avatar is one avatar of a plurality of avatars;
the predetermined position is based at least in part on the first avatar being in a first user-selected group of a plurality of user-selected groups;
each user-selected group of the plurality of user-selected groups includes a set of avatars of the plurality of avatars based at least in part on a user selection of a desired user-selected group of the plurality of user-selected groups by a user of each avatar; and
each user-selected group is positioned in the second virtual space in a different predetermined position relative to other user-selected groups of the plurality of user-selected groups.

10. The information processing system of claim 9, further comprising emitting, by the information processing system, sound made by in-group avatars of the plurality of avatars that are in the first user-selected group and not emitting sound made by out-group avatars of the plurality of avatars that are in different user-selected groups of the plurality of user-selected groups other than the first user-selected group.

11. The information processing system of claim 1, further comprising rendering, by the information processing system, a special avatar of a plurality of avatars for providing informational tips to the first avatar in at least one of the first virtual space, the second virtual space, or the third virtual space.

12. The information processing system of claim 1, further comprising rendering, by the information processing system, a fourth virtual space associated with the first avatar, wherein the fourth virtual space includes items gathered by the first avatar of the user.

13. An information processing method comprising:
rendering, on a display of an electronic device, a first avatar into a first virtual space before a predetermined content is played, wherein the first avatar corresponds to a user;
in response to determining that the predetermined content is ready to play, rendering, on the display of the electronic device, the first avatar from the first virtual space into a second virtual space while the predetermined content is played; and
in response to determining that the predetermined content is finished playing in the second virtual space, rendering, on the display of the electronic device, the first avatar from the second virtual space into a third virtual space after the predetermined content is played, wherein the first virtual space, the second virtual space, and the third virtual space are different from each other.

14. The information processing method of claim 13, wherein:
rendering the first avatar to the second virtual space includes rendering the first avatar to the second virtual space free of a user input requesting to enter the second virtual space; and
rendering the first avatar to the third virtual space includes rendering the first avatar to the third virtual space free of a user input requesting to enter the third virtual space.

15. The information processing method of claim 13, wherein rendering the first avatar to the second virtual space includes rendering the first avatar to a predetermined position allocated specifically for the first avatar.

16. The information processing method of claim 15, wherein the predetermined position is a fixed position for the first avatar such that the first avatar cannot move within the second virtual space from the fixed position.

17. The information processing method of claim 13, further comprising receiving, by the electronic device, in the first virtual space, a user input requesting an item for use by the first avatar, wherein rendering the first avatar to the second virtual space includes rendering the item for use by the first avatar.

18. One or more non-transitory computer-readable media comprising computer-executable instructions that, when executed by one or more processors of an electronic device, cause the electronic device to perform operations comprising:
rendering, on a display of an electronic device, a first avatar into a first virtual space before a predetermined content is played, wherein the first avatar corresponds to a user;
in response to determining that the predetermined content is ready to play, rendering, on the display of the electronic device, the first avatar from the first virtual space into a second virtual space while the predetermined content is played; and
in response to determining that the predetermined content is finished playing in the second virtual space, rendering, on the display of the electronic device, the first avatar from the second virtual space into a third virtual space after the predetermined content is played, wherein the first virtual space, the second virtual space, and the third virtual space are different from each other.

19. The one or more non-transitory computer-readable media of claim 18, wherein:
rendering the first avatar to the second virtual space includes rendering the first avatar to the second virtual space free of a user input requesting to enter the second virtual space; and
rendering the first avatar to the third virtual space includes rendering the first avatar to the third virtual space free of a user input requesting to enter the third virtual space.

20. The one or more non-transitory computer-readable media of claim 18, wherein rendering the first avatar to the second virtual space includes rendering the first avatar to a predetermined position allocated specifically for the first avatar.

* * * * *